March 26, 1935.  E. J. FRANKLIN  1,995,567
PULVERIZED FUEL BURNING FURNACE
Filed June 30, 1930   2 Sheets-Sheet 1
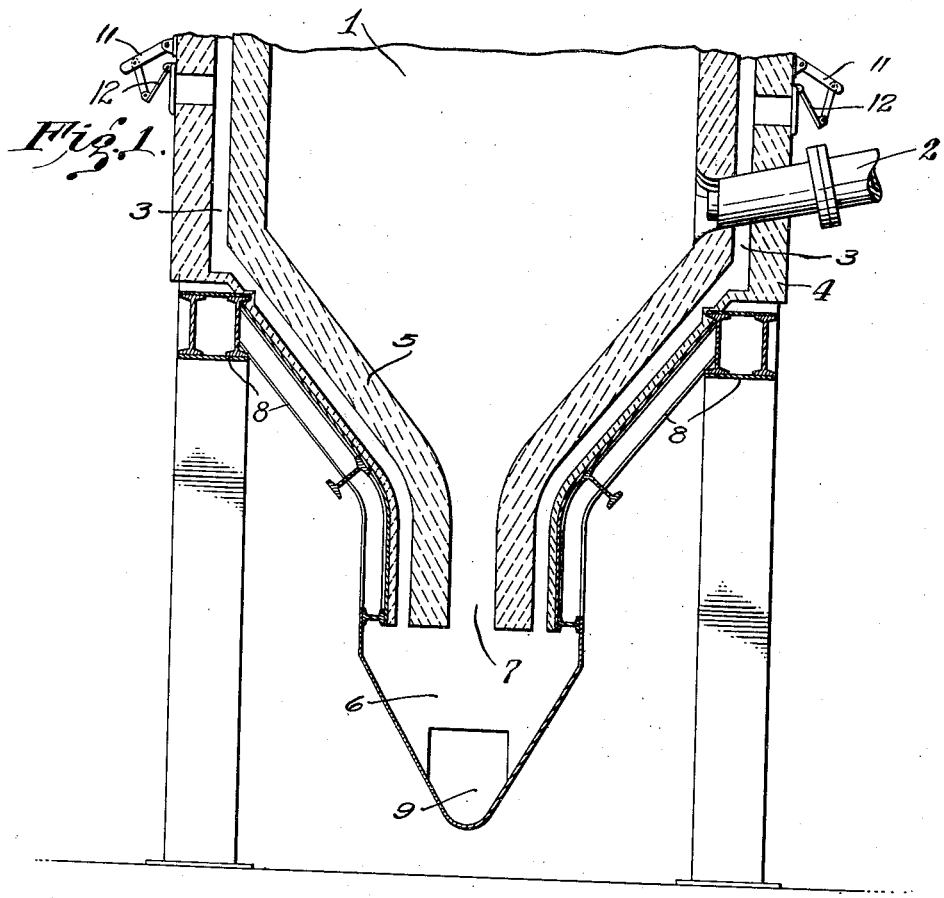
INVENTOR.
Edward J. Franklin
BY
ATTORNEYS.

March 26, 1935.  E. J. FRANKLIN  1,995,567
PULVERIZED FUEL BURNING FURNACE
Filed June 30, 1930  2 Sheets-Sheet 2
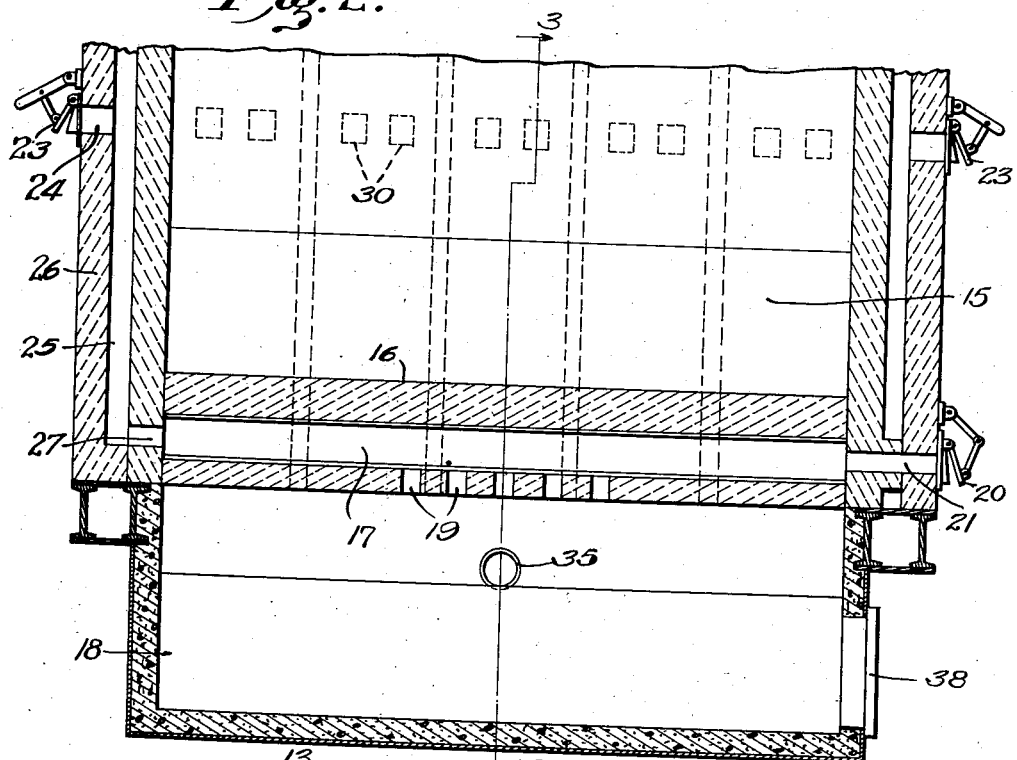
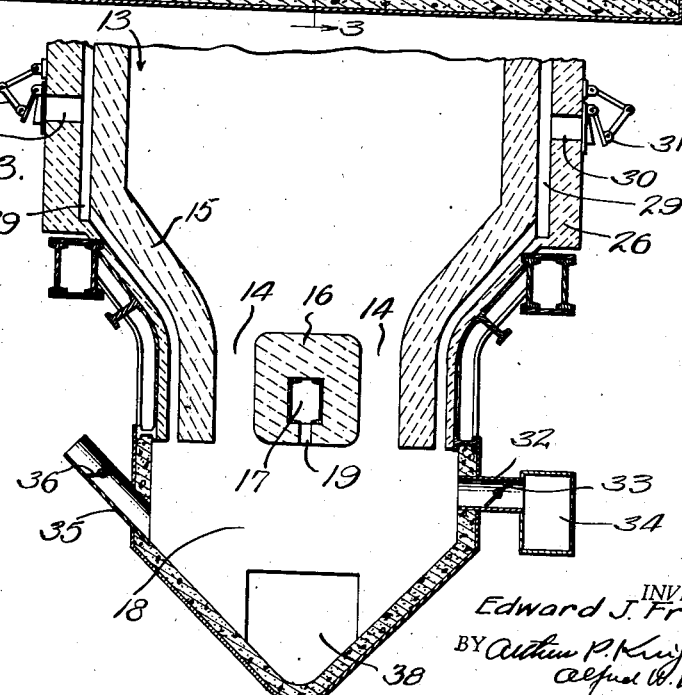
INVENTOR.
Edward J. Franklin
ATTORNEYS.

Patented Mar. 26, 1935

1,995,567

UNITED STATES PATENT OFFICE 1,995,567

PULVERIZED FUEL BURNING FURNACE

Edward J. Franklin, Salt Lake City, Utah

Application June 30, 1930, Serial No. 464,929

2 Claims. (Cl. 110—28)

This invention is a novel pulverized fuel burning furnace, and relates to means for discharging ash from and admitting air to the combustion chamber of a furnace. The invention is particularly intended and adapted for use in connection with boiler furnaces, but is applicable generally to furnaces using coal dust or similar pulverized fuel, burned in suspension in air.

The main object of the invention is to provide for discharge of the ash from a pulverized fuel furnace, in such manner as to prevent slagging or fusing of the ash.

Other objects of my invention are to provide for introducing any desired portion of the secondary air required for combustion into a powdered or pulverized fuel fired furnace through unobstructed opening means at the bottom of said furnace; to provide for controlling the amount of air so admitted to said furnace, and to provide for the discharge of ash from said furnace through such unobstructed opening means.

Further objects of the invention are to eliminate formation of slag in a pulverized fuel fired furnace by utilizing the cooling effect of secondary air admitted through the same unobstructed opening through which the ash is discharged; to enable disposal of the ash, inert material or refuse from the furnace bottoms that are exposed to radiant heat, in such manner as to eliminate fouling of these surfaces; and to provide for automatic and continual disposal by gravity of the ash, inert material, or refuse from the combustion chamber.

Further subordinate objects of the invention are to provide for preheating the secondary air for combustion without the use of the usual air preheaters and discharging same into the furnace by fans; and to provide for admission of preheated air from hollow furnace walls into the lowest part of the furnace or combustion chamber.

The accompanying drawings illustrate embodiments of my invention and referring thereto:

Fig. 1 is a vertical section of a furnace construction provided with my improved air inlet means and including means for supplying preheated air to said air inlet means.

Fig. 2 is a longitudinal vertical section of another form of my invention.

Fig. 3 is a transverse vertical section on line 3—3 in Fig. 2.

Referring to Fig. 1, chamber 1 represents the lower portion of the combustion chamber of a pulverized fuel fired furnace and more particularly, of a furnace serving a steam boiler, said furnace having walls 4 and being provided with one or more burners 2, as shown, located in suitable position above the inclined floor of the combustion chamber. Said floor is preferably formed of inclined refractory floor members 5 inclined downwardly from the side walls of the combustion chamber and mounted, for example, on beams 8 and converging downwardly to a passage in the bottom of the combustion chamber formed as a throat or opening 7 forming an open passage through which secondary air is admitted to the furnace and through which the ash resulting from the combustion of the fuel is discharged. This throat or opening 7 is relatively narrow as compared to the total width of the furnace, but is sufficiently wide to provide an unobstructed opening through which the ash may pass freely by gravity, and through which any desired portion of the required secondary air may pass upwardly into the combustion chamber. Throat 7 may be either at right angles to the axis of the burner, as shown, or may be parallel thereto, the direction of this throat being determined by local conditions in any given instance.

My invention comprises means for preheating the air passing to the ash pit. For example, as shown in Fig. 1, passages 3 may be provided in the furnace walls 4 and inclined bottom members 5, so as to receive heat from such walls and bottom members, said passages discharging downwardly into the ash receiving chamber, so that air, preheated by absorption of heat from said walls and bottom members, passes downwardly from said passages into the ash receiving chamber and then upwardly through said open passage means into the combustion chamber. Said ash pit or chamber communicates with the opening 7 in the bottom of the combustion chamber, at the lower ends of the inclined bottom members 5, said opening being unobstructed and adapted to permit free upward passage of air and free downward passage of ash. Suitable means such as clean out door 9 is provided for removing the ashes from the ash pit 6, and suitable means such as dampers or gates 12 having suitable operating means 11, are provided for regulating admission of air to the preheating passages 3.

In the operation of the invention as above described, the powdered fuel is introduced into the combustion chamber from the burner along with primary air. In general, a portion of the secondary air required for combustion will also be supplied adjacent the burner or in any other manner so as to enter the combustion chamber independently of the opening 7 in the bottom of said chamber. The gates 12 are so adjusted that a portion, say from two per cent up to any quantity desired of the secondary air required for combustion, enters the ash pit and passes upwardly through the throat 7 into the combustion chamber in such manner as to be uniformly distributed to the body of gas within the combustion chamber and provide for more effective combustion while at the same time the residual ash resulting from the combustion descends to the bottom of the combustion chamber and passes eventually downwardly through the same throat 7 through which the air passes upwardly. In this operation the incoming and ascending air serves to cool the descending ash so as to prevent fusion or slagging thereof on the bottom of the combustion chamber, and the heat thus taken up by the air serves to preheat the air and to render the combustion more efficient.

It is a fact that when air is admitted to a pulverized fuel fired furnace through the bottom of such a furnace, the formation of slag is prevented in the furnace bottom. This prevention of slagging is caused by the reduction in temperature of the ash below its fusing point due to the cooling effect of the incoming air admitted through the furnace bottom, and by the fact that air admitted through the furnace bottom, and hence below the flame from the burners, tends to create a degree of intimate turbulent mixture of air with the suspended fuel particles, and promotes complete combustion of all fuel particles, leaving the residue free from any combustible matter.

It is also known that residue containing combustible matter, when confined in a closed furnace bottom, exposed to the heat radiated from the flame in the furnace will more readily fuse or slag when such residue or ash is entirely free from combustible matter, especially when such combustible-free residue is exposed to or agitated by a stream or streams of incoming air. Secondary air, either preheated or at boiler room atmospheric temperature, when admitted through the burner, or through furnace walls at any point above the accumulated residue in the air tight bottom of the furnace combustion space, does not sufficiently promote either the prevention of slag formation nor the intimate turbulent mixture of air and fuel considered so desirable under present furnace operating conditions.

By the provision of the means 12 for controlling or regulating the amount of air admitted, such controlling means being remote from the throat 7 which is necessarily at a rather high temperature, the advantage is obtained of providing the air control valves or gates at a point external to the furnace and at a relatively low temperature, the air control devices being thereby made more susceptible to proper adjustment and less liable to injury by heat. The opening 7 in the bottom of the furnace is of sufficient size to prevent any substantial obstruction to passage of either air or ash, and does not operate to control either the supply of air or the discharge of ash, the air supply being controlled by the gates 12 or flue dampers, and the ash being discharged freely and unobstructedly at all times through the opening 7. The main purpose of the limitation of the opening 7 to a contracted throat in the furnace bottom is to limit or prevent radiation of heat from the combustion chamber onto the body of ash in the ash pit, so as to prevent slagging or fusion of the ash, and for this purpose the opening 7 is restricted as far as is consistent with unobstructed passage of air and of ash, as stated. The function of the inclined bottom members 5 is to shield the ash pit from radiation and to permit the ash falling on said members to pass downwardly by gravity to the throat 7, it being understood that the ash is sufficiently cooled by the air ascending from said throat, to prevent it from fusing onto said bottom members. At the same time the air inlet throat 7 is maintained unobstructed at all times so as to provide for free egress of ashes and free admission of air, subject only to the draft conditions and regulation by the air control means 12.

In some cases it is desirable to provide passage means comprising a plurality of ash exit openings in the furnace bottom so as to provide for the necessary width of furnace and at the same time properly shield the ashes in the ash pit from radiation of heat from the furnace. Thus, as shown in Figs. 2 and 3, the combustion chamber 13 may be provided with a plurality of air inlet, ash exit openings 14 in the bottom thereof formed between the lower portions of inclined furnace bottom members 15 and an intermediate bottom member 16. Said bottom member 16 may be of any suitable material, for example, refractory material with an interior metal core means, and may be formed with a duct or passage 17 for conducting air therethrough, the air acting to cool the walls of the bottom member 16, and the air thus heated in passing through the bottom member 16 being utilized in any suitable manner. For example, such heated air may be piped to a pulverizer or other means for utilizing the same. As shown in Figs. 2 and 3, the bottom member 16 may be provided with air supply openings 19 in the bottom thereof through which air is discharged downwardly from the duct 17 to the chamber of ash pit 18 below the furnace bottom, and in that case the admission of air to the duct 17 may be controlled by gate means 20 controlling a passage 21 leading from the outer air to the duct 17 or by gate means 23 controlling admission of atmospheric air to a passage 24 leading to a space 25 within the hollow wall 26 or the furnace, said space communicating by passages 27 with the duct 17 aforesaid so as to furnish to the duct 17 air which has been preheated by passing through the hollow furnace wall.

In this form of my invention I may also provide wall passages 29 in the furnace wall communicating with the interior of the chamber or ash pit 18 and having air inlets 30 controlled by gates 31 for regulating communication thereof with the outer air so as to supply a regulated amount of preheated air through the passages 29 to the ash pit 18. Also, as shown in Fig. 3, supplementary means may be provided for admitting secondary air to the chamber or ash pit 18 through a passage 32 controlled by damper 33 and leading from an air conduit 34. As shown at 35, a further supplementary air inlet conduit may be provided for the chamber or ash pit 18, said conduit 35 opening to the outer air and being controlled by a damper 36. The conduit 35 preferably extends upwardly at an angle from the chamber 18, so as to prevent dust from the ash pit clogging the inlet opening. Suitable means, for example, such as a door 38 may be provided at one or both ends of the ash pit for removing ash or refuse material collected therein. The air supply passages 3 in Fig. 1 and the air passages 29 and air supply openings 19 in Figs. 2 and 3 discharge downwardly into the ash pit, thereby avoiding all liability of such passages being clogged by ashes or slag falling into or onto same.

Referring further to the embodiment of Fig. 1 the bottom walls 5 are inclined so steeply as to be self-discharging of the ash through the open throat 7. The burner 2 introduces fuel and primary air above the bottom of the chamber. The ashes in pit 6 may be removed continuously or periodically; the pit floor is shown sloped down to an inclined sluiceway 9, and the ashes are sluiced away through an exit 9 normally closed by a gate preventing air inflow to the pit. It will be noted that while the throat 7 is of substantial width so that ashes may freely discharge from the chamber to the ash pit yet the throat is substantially narrower than the chamber width, and for this reason the chamber bottom walls effectively shield the pit from the radiant heat of combustion in the chamber. The pit is substantially wider than the throat. The secondary air is preheated, being flowed downwardly through the air passages 3 in the bottom walls 5, thereby incidentally cooling and protecting these walls; the passages have their exits discharging the preheated secondary air for upflow through the throat, counter to the downward discharge of ashes, the air being thence distributed effectively into the chamber to take part in combustion. Specifically the preheated air is shown discharged downwardly into the ash pit from which it passes upwardly through the throat.

It is essential to my invention that the air inlet and ash outlet opening or throat at the bottom of the combustion chamber of the furnace shall always be open or unobstructed, so as to provide for free ingress of air and free discharge of ash, and the bottom member 16 is so constructed and arranged as to shield the ash pit from radiation from the combustion chamber while not materially retarding the passage of ashes and of air.

I claim:

1. A furnace burning pulverized fuel in suspension in air, comprising a combustion chamber having means for introducing the pulverized fuel and primary air into the combustion chamber above the bottom thereof, said chamber enclosed by lateral walls, and having opposite bottom walls each sloping downwardly and inwardly from a lateral wall at a self discharging steepness of slope, and having their lower edges spaced away from the respective opposite walls to form an open space, and a closed ash pit beneath the chamber wider than such space and in communication with the chamber by such space, to receive the ashes discharged therefrom; a suspended chamber bottom member positioned in such space and subdividing such space into separate throats, each such throat being of substantial width whereby ashes may freely discharge from the chamber to the pit but being substantially narrower than the chamber width whereby the chamber bottom walls and suspended bottom member effectively shield the pit from the radiant heat of combustion in the chamber, and said ash pit being adapted for removal of ashes therefrom; and means including air passages within said suspended bottom member for admitting secondary air of combustion for upflow of such secondary air through such throats, counter to the downward discharge of ashes, and for distribution into the combustion chamber to take part in the combustion therein.

2. A non-slagging furnace burning pulverized fuel in suspension in air, comprising a combustion chamber directly above a closed ash pit; the combustion chamber being enclosed by lateral walls and having a burner for introducing the pulverized fuel and primary air into the chamber laterally above the bottom thereof for non-slagging combustion in the chamber; and the chamber bottom comprising a bottom wall sloping downwardly and inwardly from a lateral wall at a substantial slope of self discharging steepness, and having its lower edge spaced away from the opposite wall to form therewith an open throat, and the closed ash pit beneath the chamber being in direct communication with said chamber by such throat; such throat being of substantial width whereby ashes of the combustion in the chamber may freely discharge and settle from the chamber to the pit but the throat being substantially narrower than the chamber width whereby the ashes in the pit are shielded from overheating and slagging by the radiant heat of combustion in the chamber, and said ash pit being substantially wider than the throat and adapted for removal of ashes therefrom; the sloping bottom wall of the chamber constructed with interior air passages for continuous downflow of secondary combustion air therethrough, thereby preheating such air and cooling such bottom wall, and such air passages having exits discharging such preheated secondary air into the ash pit adjacent the said throat for upflow of such secondary air through such throat, counter to the downward discharge of ashes, thereby cooling the ashes and further preheating the air, and for continuous distribution of such twice preheated secondary air into the combustion chamber to take part in the combustion of pulverized fuel therein, and means for regulating the rate of such continuous secondary air inflow through such bottom wall air passages.

EDWARD J. FRANKLIN.